(No Model.)
W. F. HURD.
SAW.
No. 422,788.  Patented Mar. 4, 1890.
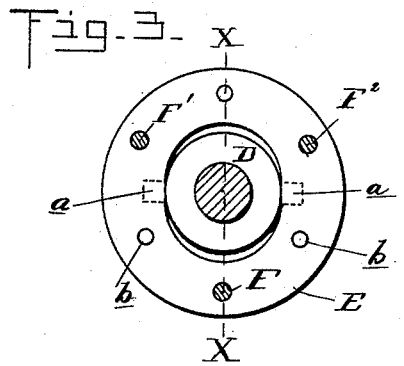
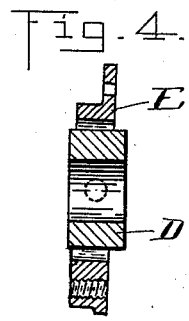
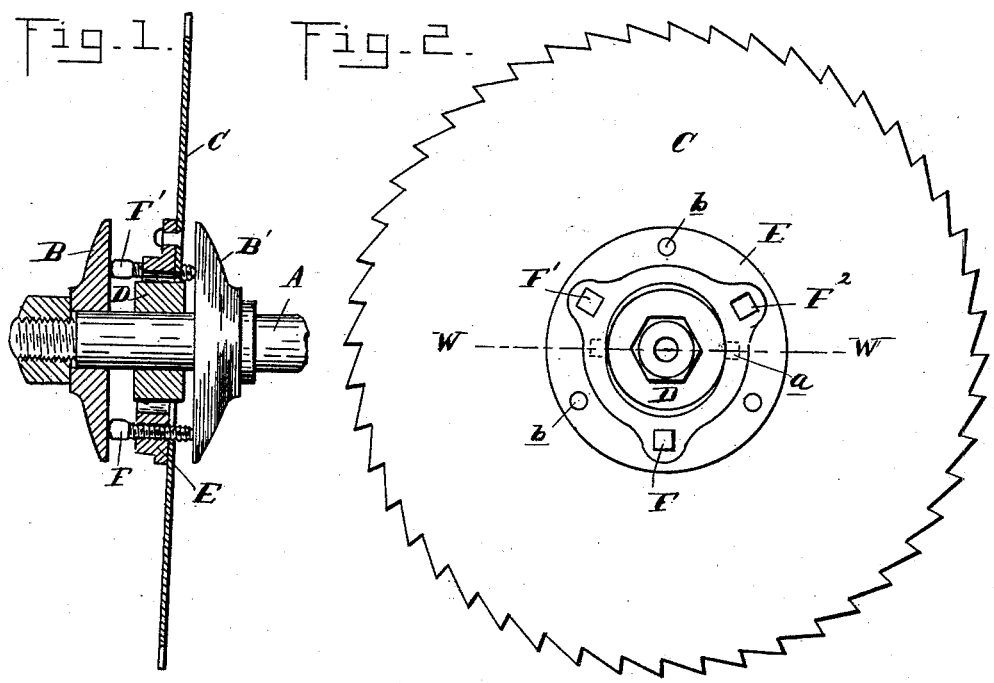
Witnesses:
Geo. P. Gregg
E. A. McBrearty
Inventor
William F. Hurd
By Thos. S. Sprague & Son
Atty.

UNITED STATES PATENT OFFICE.

WILLIAM F. HURD, OF DETROIT, MICHIGAN.

SAW.

SPECIFICATION forming part of Letters Patent No. 422,788, dated March 4, 1890.

Application filed July 22, 1889. Serial No. 318,227. (No model.)

*To all whom it may concern:*

Be it known that I, WILLIAM F. HURD, a citizen of the United States, residing at Detroit, in the county of Wayne and State of Michigan, have invented certain new and useful Improvements in Saws, of which the following is a specification, reference being had therein to the accompanying drawings.

This invention relates to new and useful improvements in adjustable wabble-saws; and the invention consists in the peculiar construction, arrangement, and operation of the parts, whereby a circular saw may be adjusted upon its arbor to have any desired degree of wabble, all as more fully hereinafter described, and shown in the accompanying drawings, in which—

Figure 1 is a vertical central section through my improved wabble-saw. Fig. 2 is an elevation thereof with the outside clamping-collar removed. Fig. 3 is a detached elevation of the oscillating eye of the saw. Fig. 4 is a section of Fig. 3 on line X X.

A is the arbor of the saw, B and B' are the usual clamping-collars, and C is a circular saw, all of known construction, except as hereinafter described.

D is a collar mounted on the saw-arbor between the clamping-collars and secured in the eye of the saw free to oscillate therein, there being preferably trunnions $a$ formed on the collar, which engage in suitable bearings on the saw. To form these bearings in a substantial manner, I preferably secure in the center of the saw a re-enforcing disk E, secured by rivets $b$ or otherwise to the saw. By forming the bearings in one face of this disk and securing the saw to this face the trunnions of the collar are held in substantial bearings. The collar is made free to oscillate in the eye of the saw by elongating the latter in the direction at right angles to the line of oscillation.

F, F', and F'' are adjusting-screws threaded through the disk and saw and made of sufficient length to project upon both sides, to allow the clamping-collars to firmly bear against the ends of the screws free of the saw.

It will be seen that a saw constructed as described forms an adjustable wabble-saw, as it will be seen that if the screw F, for instance, is turned so as to screw in or out of the saw the latter will be oscillated in the collar E, the line $w$ $w$ through the center of the trunnions forming the center of oscillation. The saw may be given, therefore, any desired degree of wabble by means of this one screw only, and fixed pins may be used for the other two screws; or, if desired, the other screws F' and F'' may be used as adjusting-screws and a fixed pin be used for the screw F. By providing three adjusting-screws, however, it is evident that the saw not only can be oscillated on the fixed line of oscillation, but it may also be adjusted laterally on its shaft. Where such adjustability is not required, however, one adjusting-screw in a line at right angles to the line of oscillation, as the screw F, is sufficient; or in lieu thereof two screws in a plane parallel to the line of oscillation, as the screws F' and F'', may be used with a fixed pin or pins to make three abutments on either side of the saw, that number being the least required to hold the saw firmly. If desired, more abutments may be used.

The collar may be made sliding on the arbor; but where the adjustment is on a fixed center of oscillation it may be fixed.

The adjusting screw or screws have suitable heads or wrench-holds for turning them readily, and, in order to reduce friction in adjusting, such screw or screws are preferably made rounding or pointing at the ends, and may engage into seats formed in the inner faces of the clamping-collars.

For ordinary degrees of adjustment as may be required in practice—for instance, in cutting larger or smaller grooves or rabbets by means of a wabble-saw—the clamping of the saw is not disturbed by such adjustment.

It is obvious that the eye of the saw need not necessarily be elongated, as the desired clearance for oscillating the collar in the eye of the saw may be obtained by reducing the collar.

What I claim as my invention is—

1. In an adjustable wabble-saw, the combination of a mandrel, a pair of collars mounted thereon, a saw mounted between said collars, a re-enforcing disk secured on the saw, and adjusting-screws passing through said disk and saw and bearing on both of said collars, substantially as described.

2. In an adjustable wabble-saw, the combination of a mandrel, a pair of clamping-collars mounted thereon, a saw mounted between said collars, an inner collar pivotally secured to the saw and in the eye thereof, and set-screws passing through the saw and bearing on said clamping-collars, substantially as described.

3. In an adjustable wabble-saw, the combination of a mandrel, a pair of clamping-collars mounted thereon, a saw mounted between said collars, a re-enforcing disk attached to said saw, an inner collar movably secured to said re-enforcing disk, and adjusting-screws passing through said disk and saw and bearing on the clamping-collars, substantially as described.

4. In an adjustable wabble-saw, the combination of the saw, the collar provided with trunnions and mounted in the eye of the saw, the re-enforcing disk secured to the saw and having bearings for said trunnions, the adjusting-screws screwed through the saw and projecting on opposite sides of the same, and the clamping-collars bearing on the ends of the screws, all arranged to operate substantially as described.

5. As a new article of manufacture, an adjustable wabble-saw consisting of the saw provided with an elongated eye and a re-enforcing disk in the center, a movable collar secured in the eye of the saw, the screws secured to the saw and projecting on opposite sides thereof to form the means for adjusting the saw, and clamping-collars bearing on the ends of said screws, substantially as described.

In testimony whereof I affix my signature, in presence of two witnesses, this 10th day of June, 1889.

WILLIAM F. HURD.

Witnesses:
P. M. HULBERT,
GEO. A. GREGG.